United States Patent
Gavin

(10) Patent No.: US 6,622,265 B1
(45) Date of Patent: Sep. 16, 2003

(54) STANDBY PROCESSOR WITH IMPROVED DATA RETENTION

(75) Inventor: Scott Michael Gavin, Villa Park, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/141,993

(22) Filed: Aug. 28, 1998

(51) Int. Cl.[7] ............................................... G06F 11/00
(52) U.S. Cl. ............................................ 714/38; 714/13
(58) Field of Search ............................. 714/38, 39, 41, 714/42, 47, 6, 7, 8, 11, 12, 13, 25; 711/133, 134

(56) References Cited

U.S. PATENT DOCUMENTS

| | | | | |
|---|---|---|---|---|
| 4,371,754 A | * | 2/1983 | De et al. ................. | 179/18 EE |
| 4,823,256 A | * | 4/1989 | Bishop et al. ............... | 364/200 |
| 5,086,429 A | * | 2/1992 | Gray et al. ................... | 371/9.1 |
| 5,155,729 A | * | 10/1992 | Rysko et al. ................. | 371/9.1 |
| 5,251,299 A | * | 10/1993 | Masuda et al. ............. | 395/200 |
| 5,434,998 A | * | 7/1995 | Akai et al. ................... | 395/575 |
| 5,568,615 A | * | 10/1996 | Sederlund et al. ..... | 395/200.08 |
| 5,737,514 A | * | 4/1998 | Stiffler .................... | 395/182.11 |
| 5,958,070 A | * | 9/1999 | Stiffler ......................... | 714/13 |

* cited by examiner

Primary Examiner—Nadeem Iqbal
(74) Attorney, Agent, or Firm—John B. MacIntyre

(57) ABSTRACT

A method for retaining data during switchover from an active processor to a standby processor in a system having redundant processors. The method comprises the steps of performing periodic data collection as a first independent task executing on the active processor, and performing memory operations as a second independent task executing on the active processor. The method may further include the step of performing data transfer operations as part of the second independent task. Performing memory operations may further include writing collected data elements to both a first memory partition associated with the active processor, and a second memory partition associated with the standby processor. Performing data transfer operations may comprise transmitting collected data elements to the standby processor over a dedicated communication link.

8 Claims, 8 Drawing Sheets

STANDBY PROCESSOR WITH IMPROVED DATA RETENTION

FIELD OF THE INVENTION

This invention relates generally to systems having standby processors and in particular to computerized systems that have one or more standby processors for greater reliability in the event of a failure, and is more particularly directed toward computerized systems with standby processors that routinely update data relating to specific time intervals and have a need to preserve this data onto a redundant processor in the event that the currently active processor fails.

BACKGROUND OF THE INVENTION

Some computerized systems, such as telecommunications systems, are required to provide high reliability service. Service reliability can be improved by having redundant processors in which one or more active processors are backed up by a standby (spare) processor.

Typically, any of the processors can serve in an active or standby role at any given time, but there is at least one on standby. If an active processor fails, or is deliberately removed from service (as, for example, when the circuit pack containing the active processor is pulled from the frame, interrupting its electrical connections to the remainder of the system), a standby processor immediately takes over and becomes an active processor. In duplexed systems, there is exactly one spare for each active processor. Exactly one of the pair of processors can be active at a time while the other acts as a spare.

Even with spare processors, service can be interrupted during the time it takes for the spare processor to come on-line. To minimize this time interval, the spare processor is typically initialized and running in a standby mode so that a cold start (i.e., processor boot) does not need to be performed during switchover to active status. The rapidity with which a spare processor can come on-line can also be affected by the need to preserve dynamic data. That is, the active processor may have dynamic (i.e., transient) data for in-progress activities, such as live phone calls in a telecommunications system, that can be lost during switchover. Thus, while service may resume quickly, in-progress activities may be prematurely terminated and have to be restarted. In the case of a telecommunication system, a phone connection may be lost and the subscriber would have to hang up and redial.

There are different approaches in the art for preventing the aforementioned problem. Typically, there is a communications link between the active processor and its spare. This can enable the spare processor to receive data on an ongoing basis during steady-state (normal or "sunny day") processing so that it may be better prepared to assume in-progress tasks should a switchover take place. This link can be used for a newly installed spare to request initialization data from its active counterpart. In theory, this data may enable the spare processor to take over activities from the active processor more gracefully. In practice, however, this method of routinely conveying data to the spare is often uneconomical in terms of CPU and I/O usage on the active processor for activities that generate large amounts of data, or where the data changes frequently and must constantly be updated.

A more economical solution for duplexed systems is to have, in addition to a communication link, "mirrored" RAM (random access memory) across the processors with specialized hardware support. Mirrored RAM provides RAM on each processor. When data is written into the mirrored RAM on one of the processors, the specialized hardware duplicates the write on the other processor's mirrored RAM. The active processor can simply write data into the mirrored RAM without any of the overhead of sending messages. Thus, only a small performance penalty is incurred.

It may be the case that only the active processor can read from or write to the mirrored RAM, while the standby processor does not have access. This helps to keep hardware cost and complexity down by eliminating problems associated with coordinating the activities of two processors attempting to access the same memory. When a switchover takes place, the formerly standby/newly active processor then has access to the mirrored RAM and can resume the activity of the active processor, while the formerly active/newly standby processor no longer has access. In some situations, there may not be any noticeable disruption in service.

Generally, from a system design standpoint, the mirrored RAM cannot be considered a substitute for ordinary RAM since it is much more expensive. Beside cost, another problem associated with mirrored RAM is that a software process or task does not have an area of mirrored RAM in its addressable space. Therefore, the mirrored RAM is a resource that must be managed. Partitions are allocated to certain applications and record layouts are defined, somewhat analogous to how a data base might be set up. Application software checks out, modifies, and writes back records to and from the mirrored RAM.

A software implementation will usually make use of ordinary RAM memory for its operations, but in addition will copy certain key data into the mirrored RAM during steady-state processing. Only data needed for the standby processor to resume a task would be stored in the mirrored RAM. Some software applications may collect data associated with a particular time period, such as traffic measurement statistics in a telecommunications system. At the end of the time period, the application must detect that the time period has elapsed and the data collected may be sent elsewhere for processing or storage. Alternatively it may be put into a log and kept for a certain period of time for retrieval on-demand within that time period, after which the data are lost.

There can be various kinds of data being collected by such an application. For example, the application may increment a count related to an event, such as call originations in a telecommunications system. The application may also actively, on a periodic basis, obtain information about something such as system activity. An example would be for it to take a periodic sample of system activity of some kind over the time interval and put the information into a usable form. An example of such periodic sampling in a telephone system is obtaining the number of currently active phone calls in 100 second intervals and summarizing the hour's activity based on these periodically acquired counts. Another possibility is generating statistics internally, within the application. Whatever the specifics of the case, it must be considered how to preserve this data during a switchover.

Accordingly, a need arises for a technique that preserves critical operational data when a system's primary processor is replaced by a standby processor. The technique should be economical in terms of system cost and complexity, and should minimize data loss during the switchover task.

SUMMARY OF THE INVENTION

These needs and others are satisfied by the method of the present invention, in which data are retained during switchover from an active processor to a standby processor in a system having redundant processors. The method comprises the steps of performing periodic data collection as a first independent task executing on the active processor, and performing memory operations as a second independent task executing on the active processor. According to one aspect of the invention, the method further includes the step of performing data transfer operations as part of the second independent task.

In one form of the invention, the step of performing periodic data collection as a first independent task further comprises the steps of waiting for expiration of a period timer, acquiring at least one designated data element, and transmitting the data element to the second independent task. The step of performing memory operations may further include writing collected data elements to both a first memory partition associated with the active processor, and a second memory partition associated with the standby processor. The step of performing data transfer operations may comprise transmitting collected data elements to the standby processor over a dedicated communication link.

In accordance with another aspect of the invention, the method further includes the step of performing end-of-interval processing on the collected data. End-of-interval processing may include performing statistical evaluation of the collected data upon expiration of a predetermined interval. The predetermined interval is preferably greater than the period between collection of successive data elements.

Further objects, features, and advantages of the present invention will become apparent from the following description and drawings.

DETAILED DESCRIPTION OF THE INVENTION

Figure 1:
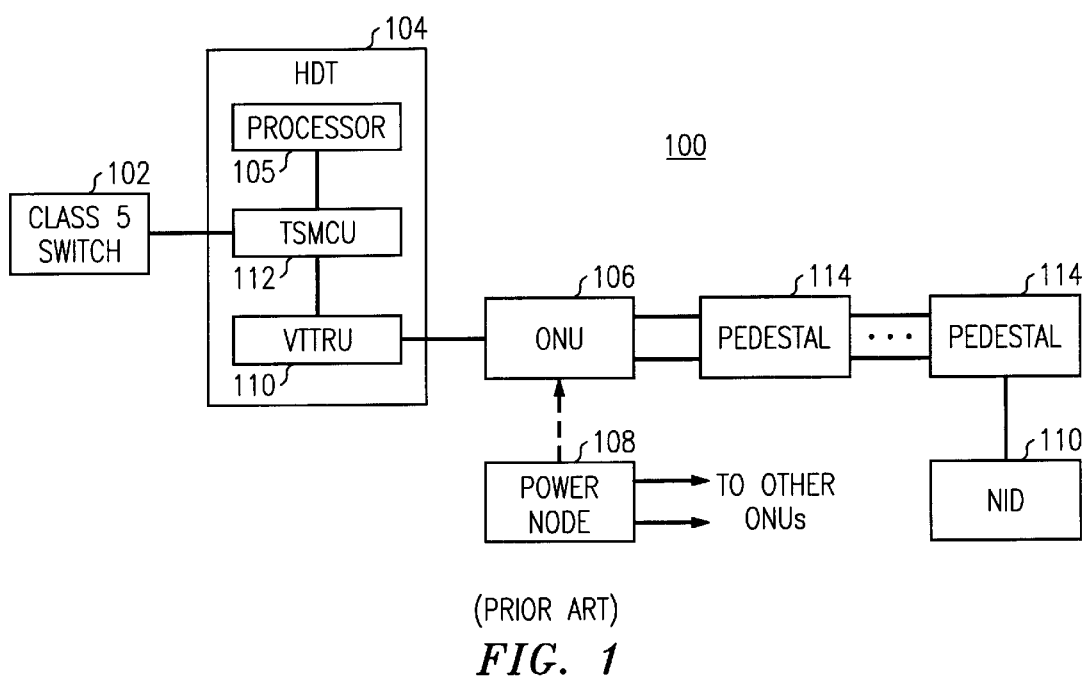
FIG. 1 is a block diagram of a typical telecommunications switching as known in the prior art.

In accordance with the present invention, a method is described for preserving data onto a redundant processor, in the event of a switchover from an active to a standby processor, that provides distinct advantages when compared to the prior art. The invention can best be understood with reference to the accompanying drawing figures. Before beginning a discussion of the invention, it is worthwhile to expand upon the previous treatment of the prior art, both to aid in understanding the invention and more fully to appreciate the advantages afforded by the present invention.

THE PRIOR ART

A telecommunications system includes an access system 100 such as a Switched Digital Video system as described in "Bell Labs Technical Journal", Vol. 1, No. 1, part 5, pp. 66–77, and manufactured by Lucent Technologies. One configuration of Switched Digital Broadband® access network supports telephony services. The architecture of such an access system includes a host digital terminal 104, a plurality of optical network units 106, a power node 108, and a plurality of network interface devices 110 and associated pedestals 114.

The host digital terminal 104 is controlled by a microprocessor 105 and serves as an integration point for all telephony services destined for the end user. It performs concentration between telephony channels delivered to the optical network units 106 and feeder trunks connecting to a class-5 switching system. Virtual Tributary Transmit-Receive units (VTTRU) 107 provide interfaces to the optical network units 106. A Time-Slot Management Channel unit (TSMCU) 112 provides the interface to the feeder trunks connecting to a class-5 switching system 102.

The optical network units 106 terminate the host digital terminal's 104 optical links that carry telephony signals and provide the interface between the end customers and the host digital terminal. The network interface device 110 provides an environmentally secure housing for telephony twisted-pair drops at living units. The pedestal 114 provides an interface between the broadband medium of the optical network unit and the network interface device 110. The power node 108 supplies power to the optical network units 106.

The following description of a prior art approach to data retention, and the subsequent description of a preferred embodiment of the present invention, are directed toward a redundant processor in a host digital terminal 104, but are equally applicable to redundant processors in any system or subsystem that employs redundant processors, even systems outside the context of telecommunications.

A prior art approach to solving the problem of data retention during switchover from active to standby processor is illustrated in FIGS. 2 through 5. In this approach, there is one task running on the standby processor in a standby mode, and two concurrently executing tasks on the active processor in an active mode. There is also a method that handles the switchover from standby to active. Two concurrent tasks on the active processor are necessary in this approach since, periodically or on-demand from the standby processor, data is transferred from the active processor to the standby processor while collection of data continues concurrently.

Figure 2:
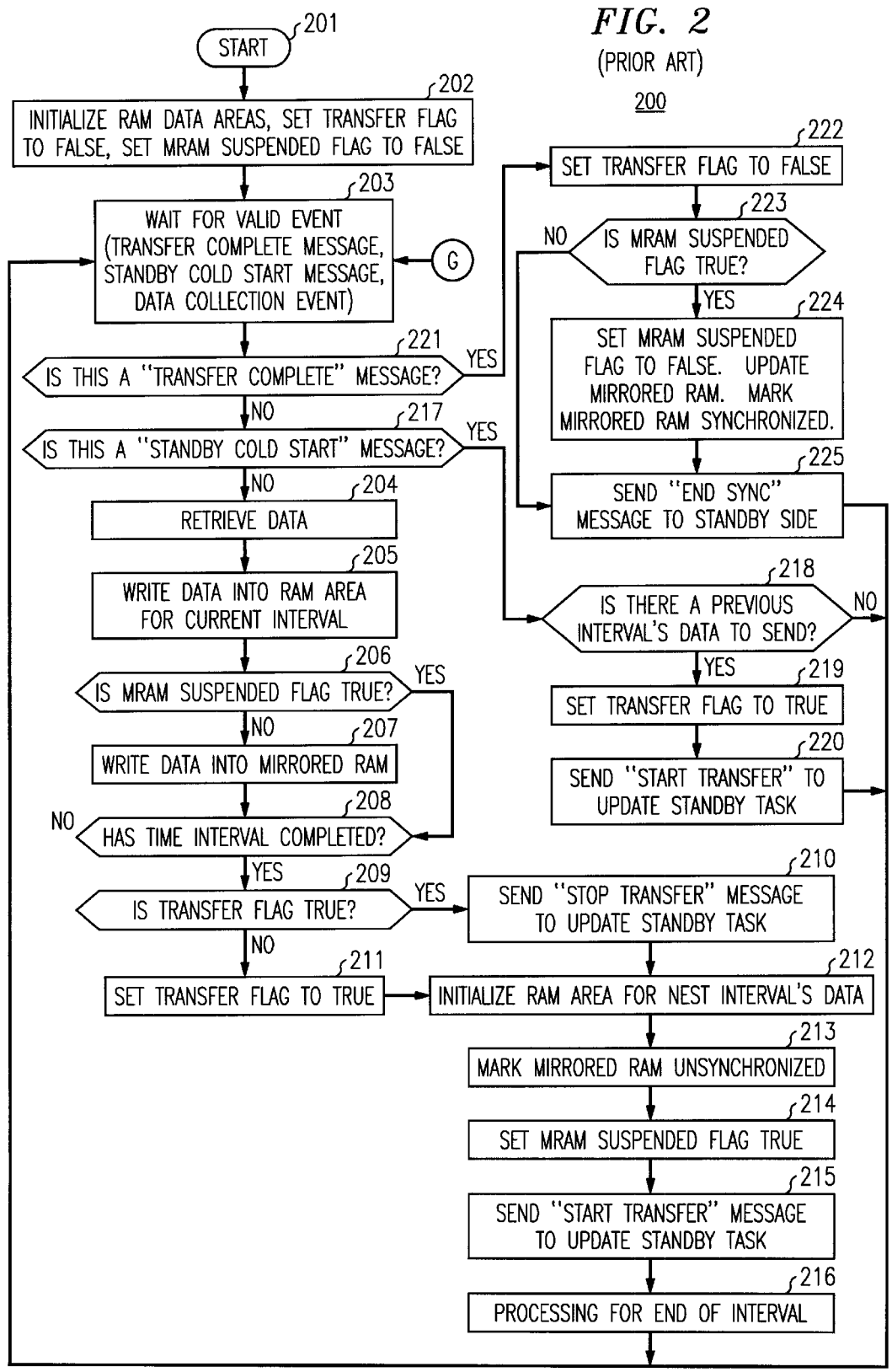
FIG. 2 depicts a data collection task, which performs ongoing activities related to the collection of data in systems of the prior art.

In FIG. 2, there is depicted a DATA COLLECTION TASK 200, which performs ongoing activities related to the collection of data. Upon boot-up of the active processor (step 201), all necessary initialization takes place in the subsequent step 202. The initialization is application-specific and can include setting the memory in both RAM and mirrored RAM to default values. Following this, in step 203, the application begins its normal routine processing. Normal routine processing consists of waiting for an event, processing that event, and waiting for the next event.

Three types of events can be detected. One type of event is a "DATA COLLECTION" event. This could be either a message containing data to collect, or it could be a message indicating that a periodic timer has expired and that data needs to be retrieved. In the latter case, the data is first retrieved in step 204 by a function or method call. In either case, the data is written into the RAM partition for the current collection interval (step 205). The data is also written into the mirrored RAM partition in step 207, provided that writing into this partition is not currently suspended as determined by the test in the preceding step 206.

If the time interval has not completed (step 208), then the next event is processed via a return to step 203. Otherwise, the TRANSFER flag is tested for TRUE in step 209, indicating that a transfer of data to the standby processor is currently taking place. If this is the case, then a "STOP TRANSFER" message is sent to the UPDATE STANDBY TASK (step 210), which is also executing on the active processor. The TRANSFER flag will be set to TRUE in step 211, if is not already.

Following this, a RAM area for the new interval's data is initialized (step 212), a bit is set in mirrored RAM to indicated that the mirrored RAM is unsynchronized in step 213 (it contains data from the just-completed interval and not the new interval), writing to mirrored RAM is suspended (step 214), and a "START TRANSFER" message is sent to the UPDATE STANDBY TASK that executes on the active processor in step 215. Then, the application will perform any application-specific processing related to the end of the time interval in step 216. This might include computations on the data, error condition detection and reporting (e.g., statistics indicating overload), or sending the data to another processor via messaging. It may also include preparations for the next interval. The next event is then processed via a return to step 203.

Another event that could be detected by the DATA COLLECTION TASK is a "STANDBY COLD START" message in step 217. This message comes from the standby processor upon its being initialized. If there is a previous completed interval (step 218), then the DATA COLLECTION TASK will set the TRANSFER flag to TRUE in step 219, and send a "START TRANSFER" message to the UPDATE STANDBY TASK that executes on the active processor in step 220. The next event is then processed via a return to step 203.

The third type of event processed by the DATA COLLECTION TASK is a "TRANSFER COMPLETE" message (step 221). This message comes from the UPDATE STANDBY TASK that executes on the active processor to indicate that transfer of data to the standby processor has completed. The TRANSFER flag is set to FALSE in step 222. If the mirrored RAM is suspended (step 223), then the MRAM SUSPENDED flag will be set to FALSE, the mirrored RAM will be updated with the data from the RAM for the current collection interval, and a bit will be set in the mirrored RAM to indicate that the mirrored RAM is synchronized (step 224). Whether the mirrored RAM was suspended or not, an END-SYNC message will be sent to the standby processor in step 225 indicating the end of the data transfer.

Figure 3:
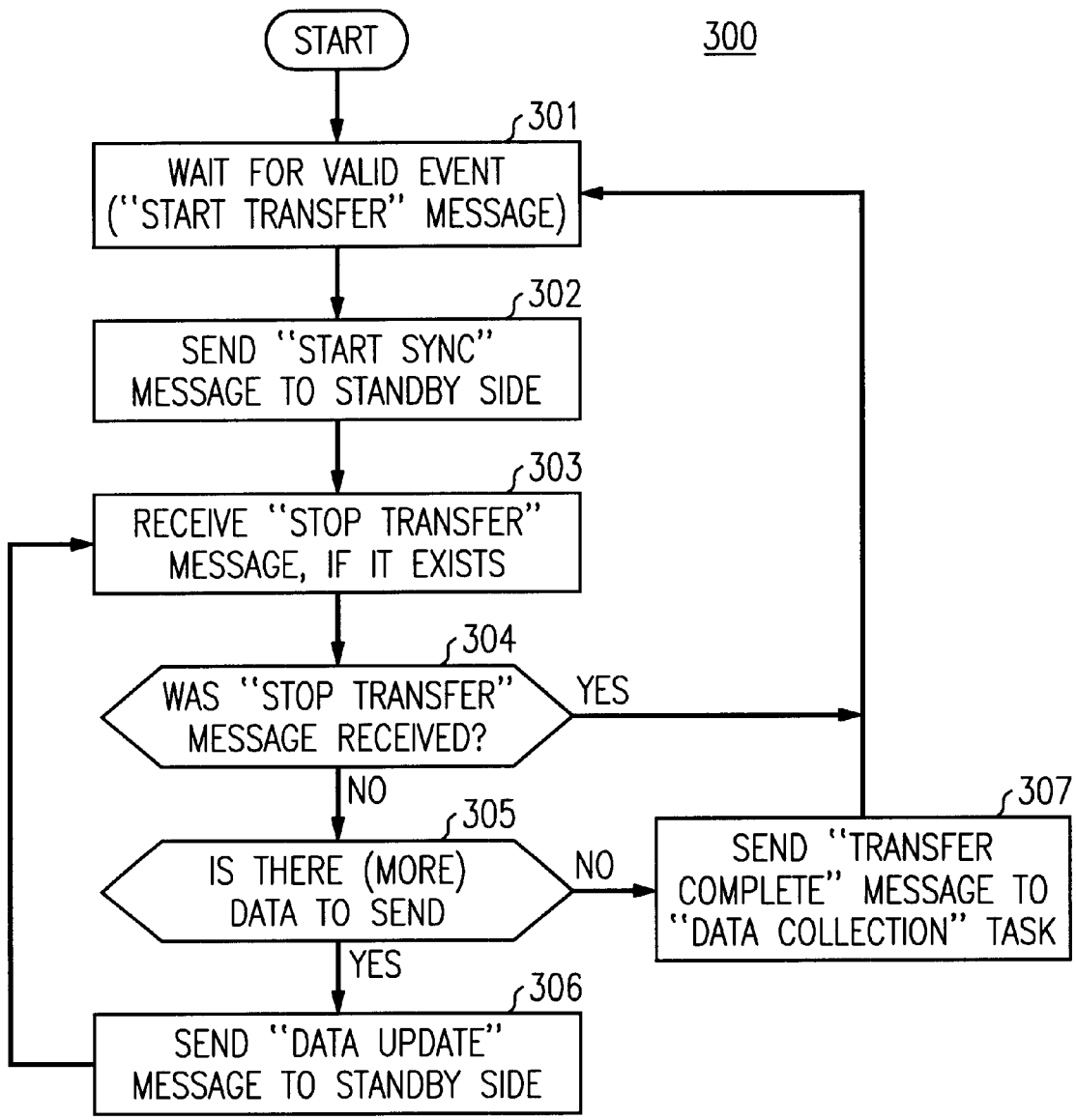
FIG. 3 is a flow chart of a routine processing task that may be found in systems of the prior art.

FIG. 3 illustrates the UPDATE STANDBY TASK 300. Normal routine processing consists of waiting for an event, processing that event, and waiting for the next event. Two types of events can be detected. When the task is idle, the only valid event to be received is a "START TRANSFER" message. When this message is received in step 301, a "START SYNC" message is sent to the standby processor to indicate that synchronization of data with the active processor has begun (step 302). Then a loop is entered (step 303).

First, a check is made in step 304 to see if a "STOP TRANSFER" message is present. If it is, then the task suspends, waiting for a "START TRANSFER" message via a return to step 301.

Otherwise, a check is made to see if there is more data to send (step 305). If there is data to send, then a message is sent in step 306 with the next set of data that will fit into this message, and the loop repeats. If there is no more data to send, then a "TRANSFER COMPLETE" message is sent to the DATA COLLECTION TASK in step 307 and the task suspends, waiting for a "START TRANSFER" message.

Figure 4:
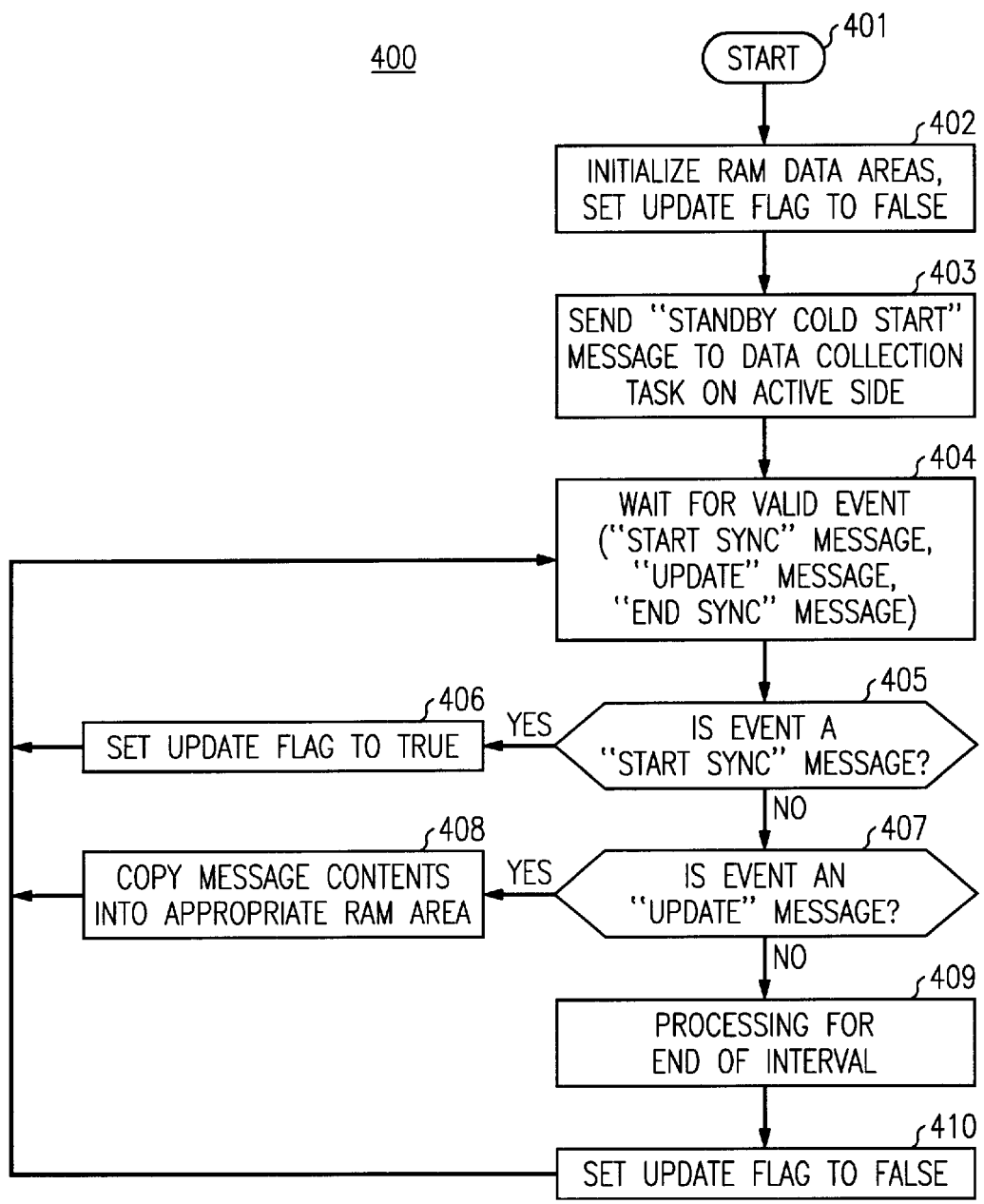
FIG. 4 depicts a standby processing task of the prior art.

FIG. 4 depicts the STANDBY task, which runs on the standby processor. Upon boot of the standby processor (step 401), all necessary initialization takes place in subsequent step 402. The initialization is application-specific and may include setting the memory in both RAM and mirrored RAM to default values. Then, a "STANDBY COLD START" message is sent to the active processor in step 403 to request that data from a previous interval begin to be transferred, if it is available. This is needed because the active processor may have been running all along, and the standby processor may have just come up.

Following this, the application simply begins its normal routine processing in step 404. Normal routine processing consists of waiting for an event, processing that event, and waiting for the next event. Two types of events can be detected. One event is the receipt of a "START SYNC" message from the active processor in step 405. This will cause the UPDATE flag to be set to TRUE in step 406, and for the task to wait to detect the next event via a return to step 404. If the event is an "UPDATE" message (step 407), the contents of the message will be copied to the appropriate place in RAM memory for storing this data in step 408, which is always for a previously completed interval. Then, the task will wait to process the next event via a return to step 404.

Figure 5:
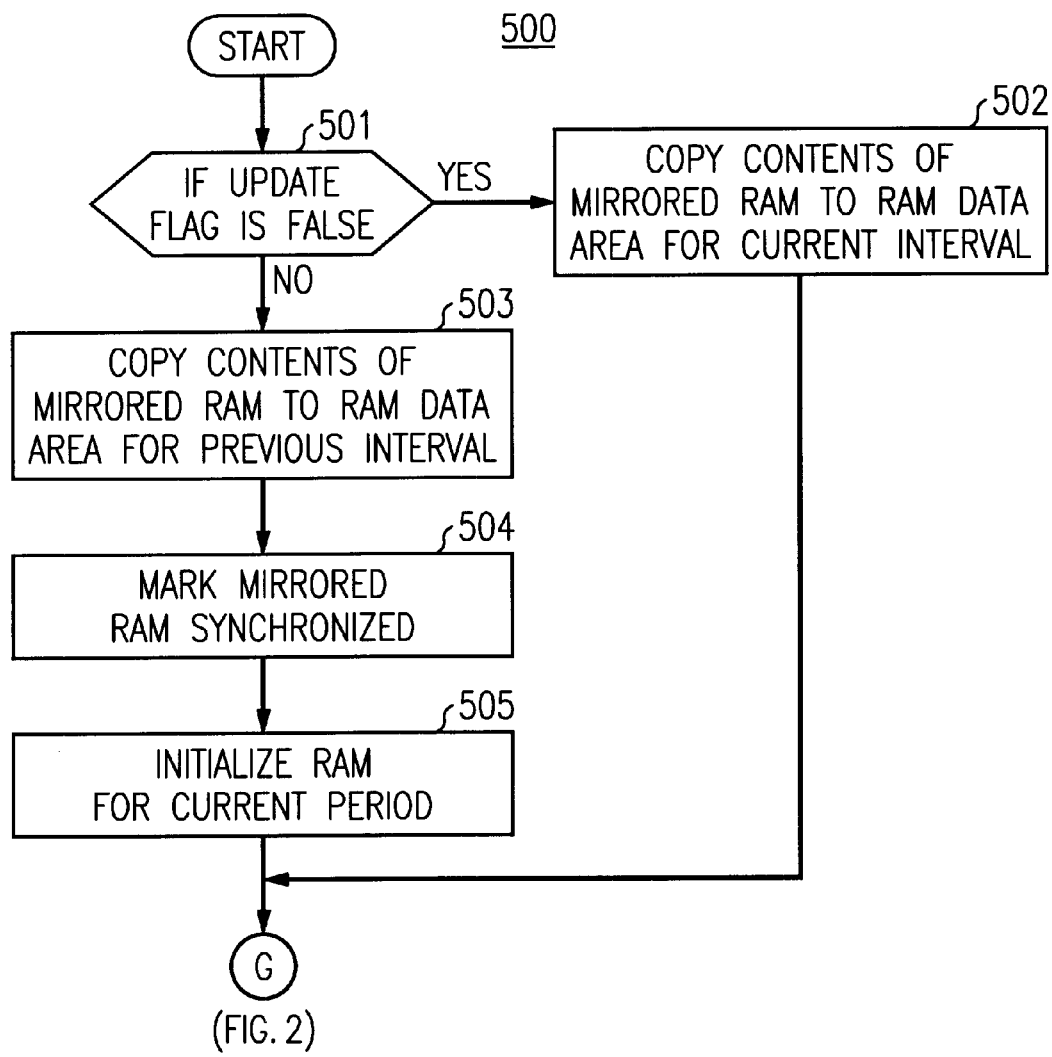
FIG. 5 is a flow chart of a transition-to-active-mode task used in prior art systems.

Finally, if the event is an "END SYNC" message, processing is completed for the end of the interval in step 409, the update flag is set to FALSE in step 410, and the task waits to receive the next event via a return to step 404. The UPDATE flag is tested using the "TRANSITION TO ACTIVE" task 500 illustrated in FIG. 5, which is executed when the standby processor switches to active. It is executed on this newly active processor. The UPDATE flag is tested in step 501, and, if the UPDATE flag is TRUE, then the contents of the mirrored RAM are copied into the RAM area for the current time period that is not yet completed in step 502. If the UPDATE flag is FALSE, the contents of the mirrored RAM are copied into the RAM area for the previously completed time period in step 503, the mirrored RAM is marked as synchronized (step 504), and the RAM for the current period is initialized in step 505. Following the transition to active from a standby state, the DATA COLLECTION task begins processing by waiting for the next valid event as indicated in FIGS. 2 and 5 by connector "G."

DESCRIPTION OF A PREFERRED EMBODIMENT

The method in accordance with the present invention comprises three cooperating parts: (1) steady-state processing on the active processor, (2) steady-state processing on the standby processor, and (3) transition from standby to active. Mirrored RAM is a hardware requirement, as discussed in the preceding section. A given application has its own mirrored RAM partition. Within this partition, there is a flag indicating whether the mirrored RAM is synchronized between the two processors.

Figure 6:
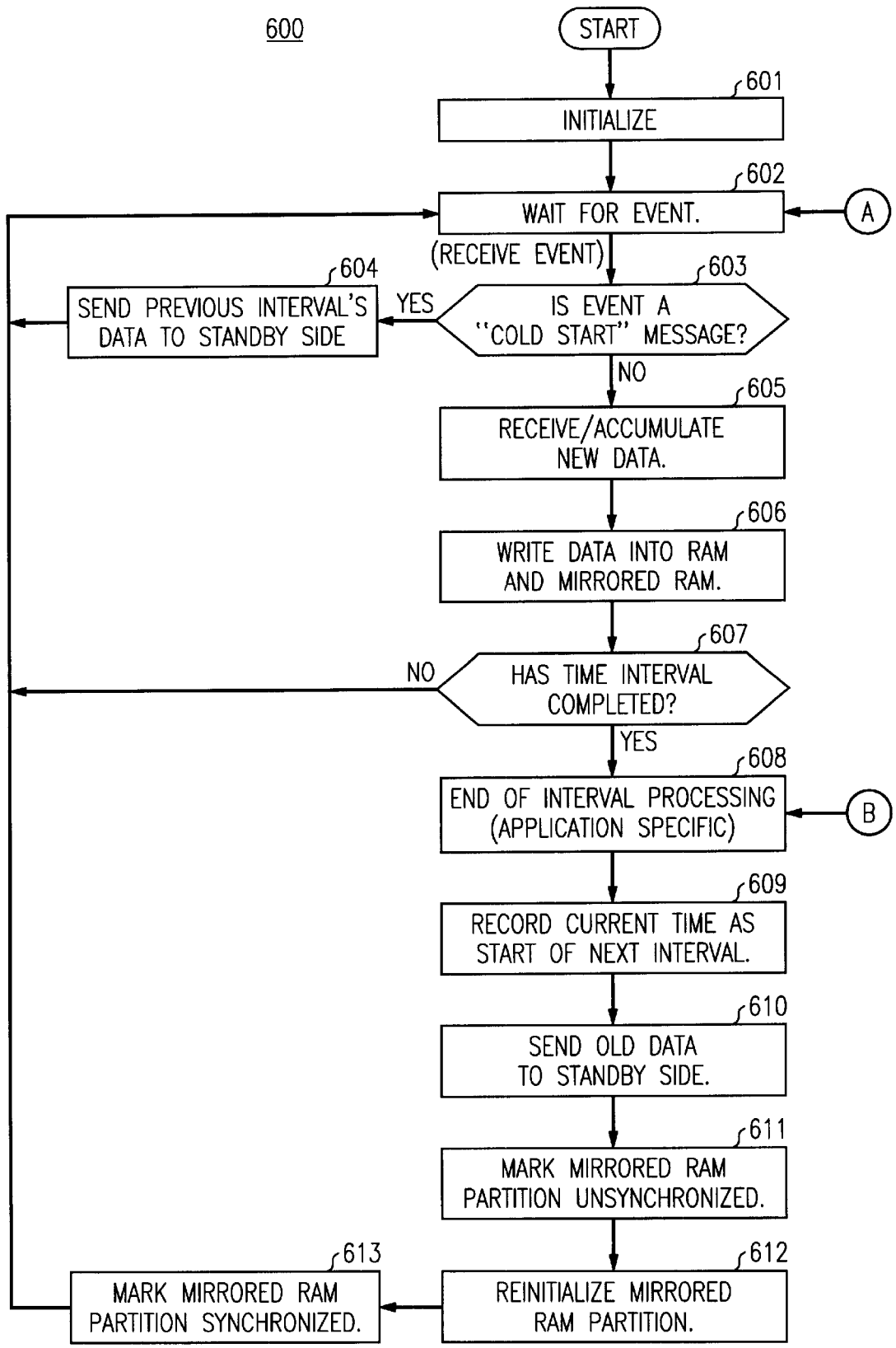
FIG. 6 depicts a steady-state processing task on the active processor used for receiving data in a system in accordance with the present invention.
Figure 7:
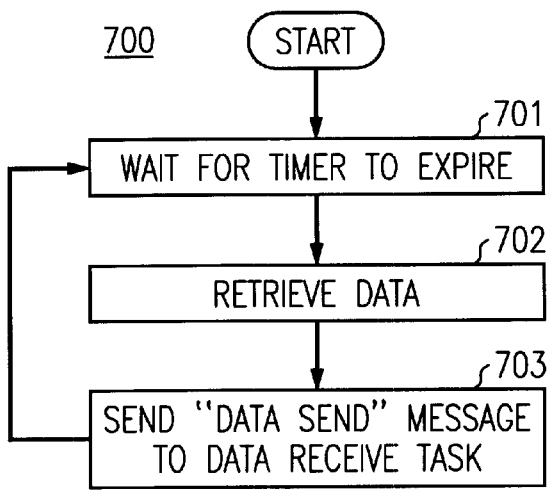
FIG. 7 is a flow chart of a periodic activity task that collects data of a certain type in accordance with the present invention.

FIGS. 6 and 7 depict steady-state processing of the application on the active processor. Two tasks are illustrated. Upon boot-up of the newly active processor, all necessary initialization takes place in step 601 of the DATA RECEIVE task 600 (FIG. 6). The initialization is application-specific and can include setting the memory in both RAM and mirrored RAM to default values. Following this, the task begins its normal routine processing in step 602.

The PERIODIC ACTIVITY task 700 (FIG. 7) is used only to collect data of a certain type, and is not needed if this type of data is not being collected. This is data that must be collected on a frequent periodic basis, such as data pertaining to system activity. In a telecommunication system, an exemplary task would be collecting a count of the number of currently active phone calls every 100 seconds. In this case, the task waits for a periodic 100 second timer to expire in step 701, collects the system activity data in step 702, and sends it in a "DATA SEND" message (step 703) to the DATA RECEIVE task, which is responsible for summarizing/ storing this data.

Upon detecting an event, the DATA RECEIVE task 600 determines if the event is a "COLD START" message (step 603) from a newly booted standby processor, which is a rare event. If it is, then the DATA RECEIVE task 600 sends, via messaging, the data for the previous interval to the standby processor (step 604). If it is not a "COLD START" message, then the message may contain data for the current interval. The DATA RECEIVE task thus accumulates or receives time-interval data (step 605) and writes this data into its RAM memory in step 606.

This data can be of any kind pertaining to the time interval. For example, it can be the kind of data sent from a PERIODIC ACTIVITY task 700 (FIG. 7), or it can simply be an asynchronous event, such as call originations in a telecommunications system. Any data that needs to be preserved during a switchover (or side switch, as it is sometimes called) also needs to be written to the appropriate mirrored RAM partition. At this time, the active processor checks whether the time interval has ended in step 607 (or the event itself might indicate this). If the time interval has not completed, then the application waits for the next event via a return to step 602.

If the time interval has ended, then the application will perform any application-specific processing related to the end of the time interval in step 608. This can include computations on the data or error condition detection and reporting. An example would be statistics indicating overload. For some applications, the data for the just-completed time interval must be kept for on-demand retrieval for a specified period of time. In this situation, the data (in RAM) must be marked (step 609) to indicate the time interval it represents, and then it must also be sent to the standby processor in step 610 so that the standby processor will have this data in the event that the standby processor is switched over to active. In other applications, the data may be sent to a log or some other processor.

The mirrored RAM partition must now be re-initialized to default values. First the partition is marked "unsynchronized" in step 611. Then, the data are re-initialized in step 612. Finally, the partition is marked "synchronized" in step 613. The purpose of marking and unmarking the partition is so that the newly active processor will be able to tell if the data is in a consistent state after a switchover. The application then waits for another event via a return to step 602, and so begins collecting data for the next interval.

Figure 8:
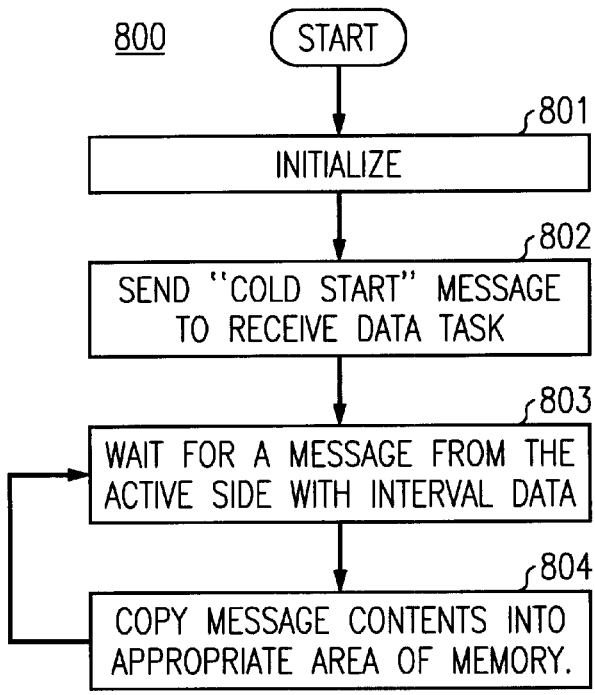
FIG. 8 depicts steady-state processing for the standby processor in accordance with the present invention.

FIG. 8 depicts steady-state processing for the standby processor. First it must initialize in step 801. If on-demand retrieval of the previously completed interval's data is required by the application, then the standby processor will, as part of its initialization, request by messaging the required data from the currently active processor. As shown in FIG. 8, this is done by sending a "COLD START" message to the active processor in step 802 to indicate that the standby processor has just initialized. If the standby processor is being booted before the active processor has completed a full interval, there will be no such data, and no response from the active processor. Following this, if on-demand retrieval of data for previous intervals is required, the standby processor will receive data from the active processor periodically whenever a new full interval is completed (step 803). The standby processor will copy this data to the appropriate place in RAM in step 804 so it will continue to be available after a side switch.

Figure 9:
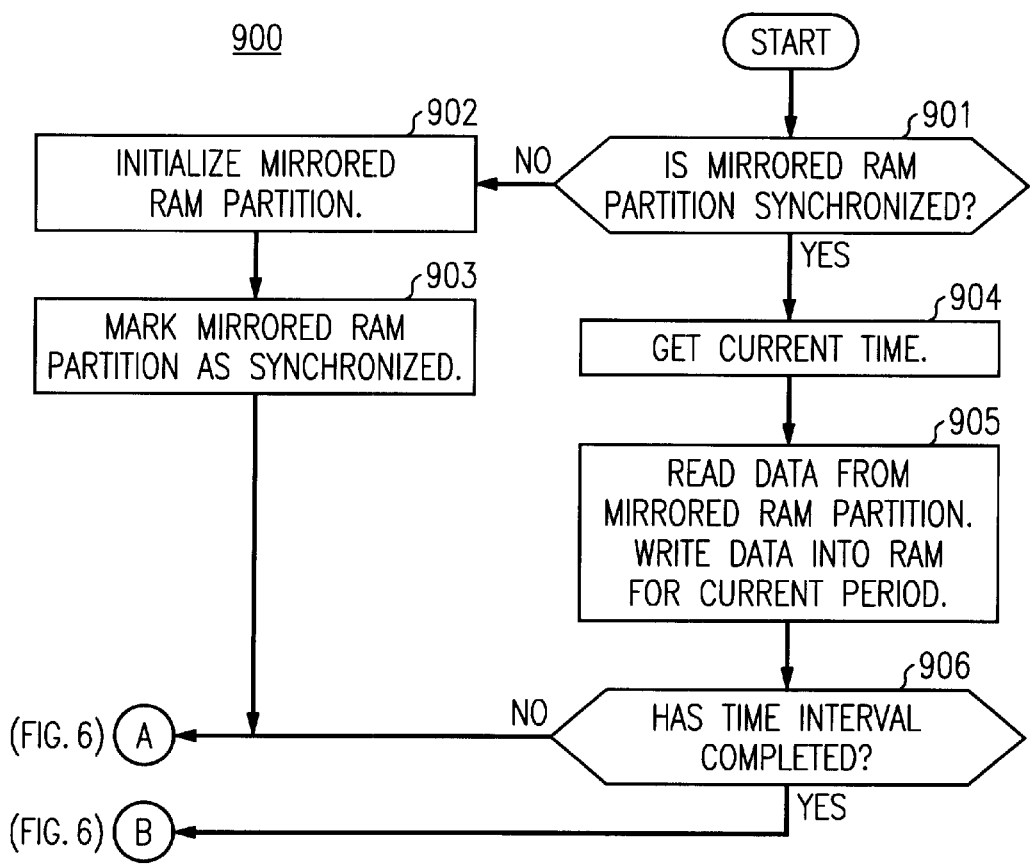
FIG. 9 illustrates the transition from standby to active mode in accordance with the present invention.

FIG. 9 illustrates the transition 900 from standby to active. When switchover occurs, the application will be notified and will begin this procedure. The first thing the newly active processor does is to check, in step 901, whether the mirrored RAM partition is synchronized. If it is not, then this means that the formerly active processor was in the middle of processing the end of an interval, but had not yet completed reinitializing the mirrored RAM partition. Therefore, the newly active processor must do this in step 902, and then mark the mirrored RAM partition as synchronized in step 903.

Following this, the newly active processor begins its steady state processing by waiting for the appropriate event. This is labeled "A" in FIGS. 6 and 9. If the mirrored RAM partition is already synchronized, then the newly active application must obtain the time (step 904) and read the data from the mirrored RAM partition into its local RAM (step 905). It then checks, in step 906, whether the time interval has completed. If it has completed, then the active processor performs its application-specific end-of-interval processing, records the current time as the start of the next interval, and synchronizes the mirrored RAM partition (connector "B" in FIGS. 6 and 9). Once this is completed, the newly active processor begins steady-state processing. This is labeled "A" in FIGS. 6 and 9.

One noteworthy improvement over the prior art afforded by the present invention is that the present invention serializes the collection of data for the current interval and the sending of the previous interval's data to the standby processor, whereas prior art systems had two tasks that performed these activities concurrently. Of course, the theory behind the concurrent tasks of the prior art was that the sending of data to the standby processor would minimally interfere with the collection of data for the current interval.

This was of special concern for sampling data that is collected periodically, such as, for example, taking a count of the number of currently active calls in a telecommunications system every 100 seconds, and then summarizing a set of these samples for the time interval (which might be one hour, for example). If the sending of the data to the standby processor took too long, then a sampling might be delayed or missed altogether, thus producing erroneous results. By allowing the processing of the current interval's data to proceed uninterrupted, this concern disappears.

But there is a significant drawback to the prior art design. The complexity of the design is greatly increased, since the two tasks on the active processor have to coordinate their activities. The method in accordance with the present invention is much simpler, and, therefore, less expensive to implement. The method in accordance with the present invention solves the same problem in a different way by delegating the collection of periodic sampling data to another concurrently executing task, the PERIODIC ACTIVITY task in the preferred embodiment of the invention. This task collects the data on time and then sends it to the DATA RECEIVE task. The message will simply remain in the DATA RECEIVE's input queue until the task is able to process it. Possibly, there will be a delay in processing the data if the DATA RECEIVE task is sending data to the standby processor, but the data will not be lost. It will be processed eventually.

There has been described herein a method for preserving data onto a redundant processor, in the event of a switchover from an active to a standby processor, that is relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A method for retaining data during switchover from an active processor to a standby processor on a system having redundant processors, the method comprising the steps of:
    performing periodic data collection as a first independent task executing on the active processor;
    waiting for expiration of a period timer;
    acquiring at least one designated data element;
    transmitting the data element to a second independent task; and
    performing memory operations as a second independent task executing on the active processor.

2. The method in accordance with claim 1, further including the step of performing data transfer operations as part of the second independent task.

3. The method in accordance with claim 1, wherein the step of performing memory operations further comprises writing collected data elements to both a first memory partition associated with the active processor, and a second memory partition associated with the standby processor.

4. The method in accordance with claim 2, wherein the step of performing data transfer operations comprises transmitting collected data elements to the standby processor over a dedicated communication link.

5. A method for retaining data during switchover from an active processor to a standby processor on a system having redundant processors, the method comprising the steps of:
    performing periodic data collection as a first independent task executing on the active processor;
    performing memory operations as a second independent task executing on the active processor; and
    performing statistical evaluation of the collected data upon expiration of a predetermined interval.

6. The method in accordance with claim 5, wherein the predetermined interval is greater than the period between collection of successive data elements.

7. The method in accordance with claim 1, further comprising the step of switching from the active processor to the standby processor.

8. The method in accordance with claim 5, further comprising the step of switching from the active processor to the standby processor.

* * * * *